United States Patent [19]
Tourneur

[11] 3,848,709
[45] Nov. 19, 1974

[54] DISC BRAKE CALIPER AND FRICTION PAD MOUNTING STRUCTURE

[75] Inventor: Roger Tourneur, Saint-Maur, France

[73] Assignee: Societe Anonyme D.B.A., Paris, France

[22] Filed: July 2, 1973

[21] Appl. No.: 376,059

[30] Foreign Application Priority Data
July 12, 1972 France .............................. 72.25256

[52] U.S. Cl. ............................... 188/73.3, 188/73.5
[51] Int. Cl. .......................................... F16d 55/224
[58] Field of Search ........ 188/73.3, 73.5, 72.4, 72.5

[56] References Cited
UNITED STATES PATENTS
| | | | |
|---|---|---|---|
| 3,155,194 | 11/1964 | Gancel | 188/73.3 X |
| 3,368,647 | 2/1968 | Laverdant | 188/73.3 |
| 3,517,777 | 6/1970 | Beller | 188/73.1 |

FOREIGN PATENTS OR APPLICATIONS
| | | | |
|---|---|---|---|
| 1,207,160 | 12/1965 | Germany | 188/73.1 |

*Primary Examiner*—George E. A. Halvosa
*Attorney, Agent, or Firm*—Ken C. Decker; William N. Antonis

[57] ABSTRACT

A disc brake is disclosed which includes a U-shaped fixed support straddling a rotary disc and two pads supported by an axial pin attached to said support at one radial and thereof. Clamping means are associated with the fixed support to apply the pads against the respective faces of the disc. The pin is located at the outside of the periphery of the disc, and two radial abutting surfaces are provided on each arm of said radial end of the support. These abutting surfaces are situated on each side of a plane passing by the pin and perpendicular to the radial plane passing by the pin for permitting each of the pads to anchor by one of its radial edges on one or the other of the abutting surfaces, according to the direction of disc rotation. Each pad comprises a lug extending radially at the outside of the periphery of the disc along said radial edge, the pin extending through this lug.

6 Claims, 3 Drawing Figures

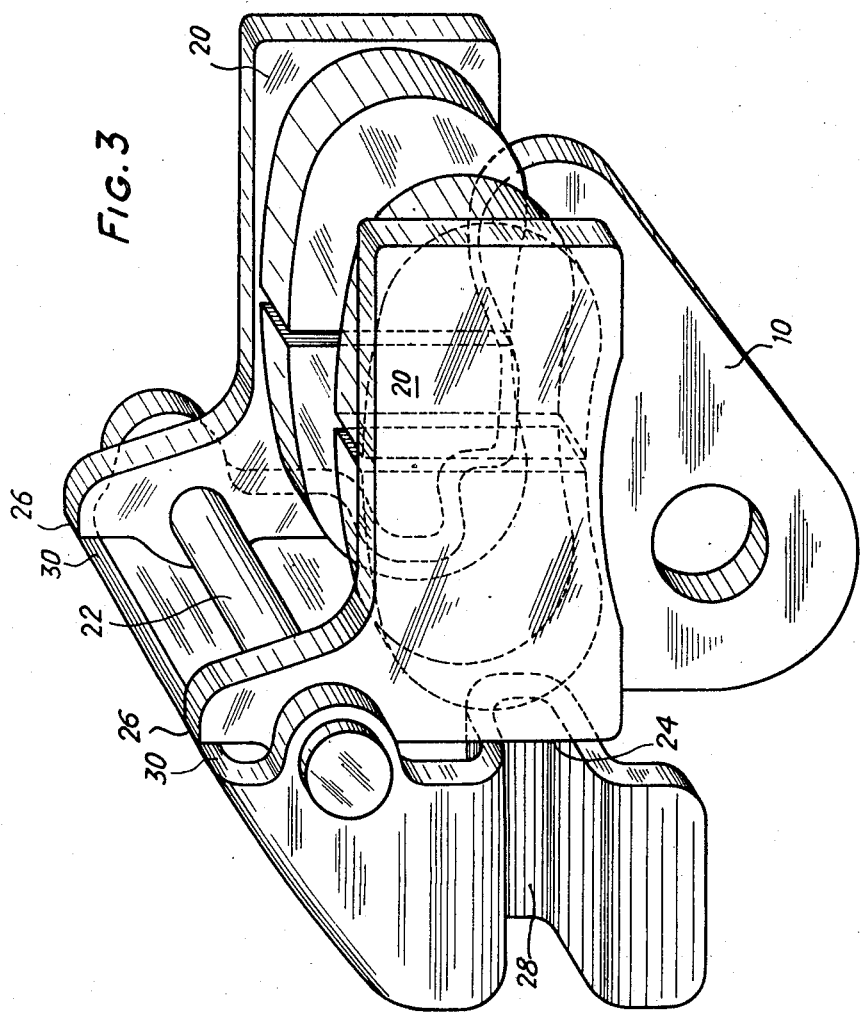

DISC BRAKE CALIPER AND FRICTION PAD MOUNTING STRUCTURE

The object of the invention is a disc brake.

The invention relates more particularly to a disc brake comprising a U-shaped fixed support straddling a rotary disc, two pads supported by an axial pin attached to said fixed support and located at the outside of the periphery of the disc, clamping means associated with the fixed support to apply the pads against the respective faces of the disc, and abutting means provided in said support to anchor said pads in the two directions of disc rotation.

In the disc brakes of this type, abutting means generally used to anchor the pads are two surfaces provided on the fixed support, each of these surfaces cooperating with one or the other of the two radial edges of the pads, according to the direction of disc rotation, the pin being generally located approximately at an equal distance of these radial edges. In such prior art disc brakes, the shape of the fixed support is complicated and the overall dimensions of the brake are substantial.

According to the invention, this drawback is avoided by the provision of a disc brake of the above type wherein the abutting means comprise two radial abutting surfaces provided on each arm of said support, said abutting surfaces being situated on each side of a plane passing by said pin and perpendicular to the radial plane passing by said pin for permitting each of said pads to anchor by one of its radial edges on one or the other of said abutting surfaces, according to the direction of disc rotation.

According to another embodiment of the invention, each of said pads comprises a lug extending radially at the outside of the periphery of the disc along said radial edge, said pin extending through said lug.

According to still another embodiment of the invention, the abutting surfaces are provided on the radial end of said support adjacent said pin. Preferentially, the support is made of a folded metal sheet, each arm of the U-shaped support being formed with axially extending bent portions connected by portions parallel to the plane of the disc, each of said abutting surfaces being provided by at least one of said axial portions.

With such an arrangement the fixed support is very simple and cheap to make.

A disc brake embodying the invention will be now described with reference to the accompanying drawings in which:

FIG. 3 is a diagrammatic perspective view showing how the pads are arranged on the fixed support of the brake shown in FIGS. 1 and 2.

Figure 1:
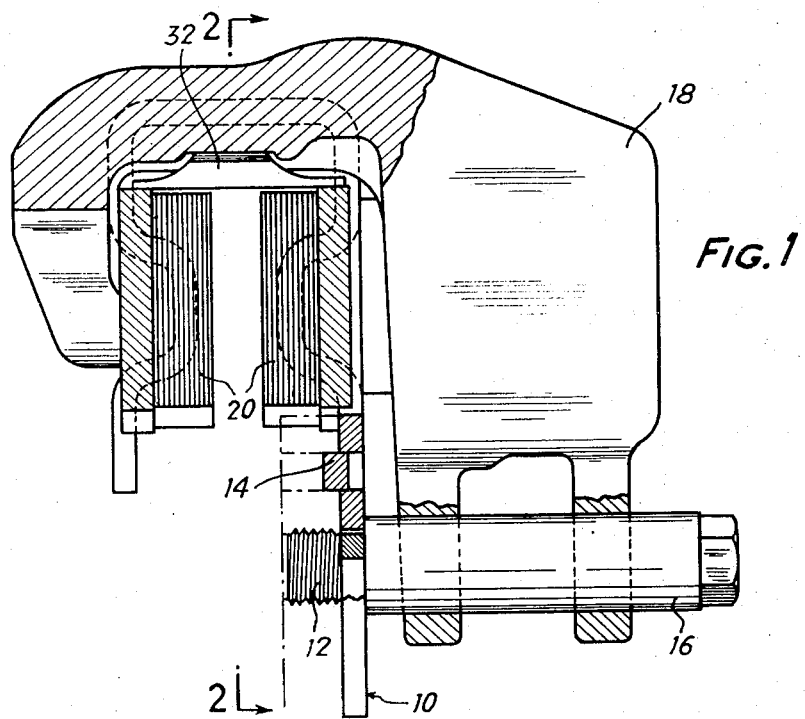
FIG. 1 shows a partial section of a disc brake embodying the invention.

The disc brake illustrated comprises a fixed support 10 made of a folded metal sheet in the form of a U straddling the disc (not shown) and fastened to a fixed vehicle portion (shown in phantom line in FIG. 1) by means of a bolt 12. The fixed support is also fixed in position by a stamped tab 14 which engages in a groove in the fixed vehicle portion. A column 16 is attached to the fixed support 10 by the bolt 12 and supports a caliper 18 which straddles the disc and which can move axially along this column. Two pads 20 are pivotably mounted on a pin 22 attached to the support 10 at the outside of the periphery of the disc. The pads 20 are located between the two arms of the caliper, which is provided with clamping means (not shown) for applying the pads against the two respective faces of the disc.

Each pad 20 comprises a lug extending radially at the outside of the periphery of the disc along one of its radial edges. The pin 22 extends through the lugs of the pads 20 to separate the corresponding radial edge of each pad in two bearing edges, 24, 26.

Each arm of the U-shaped fixed support 10 is formed with axially extending bent portions connected by portions parallel to the plane of the disc, to form a projection 28 and a surface 30 extending axially towards the plane of the disc. The projection 28 and the surface 30 form two radial abutting surfaces provided on each arm of the support 10. The abutting surfaces 28, 30 are situated on each side of a plane passing by the pin 22 and perpendicular to the radial plane passing by said pin, and at the radial end of the support 10 adjacent the pin 22.

The abutting surfaces 28 and 30, forming abutting means, are provided on the fixed support to anchor the pads 20 by one of their two radial bearing edges 24, 26 according to the direction of disc rotation. The pin 22 and the two abutting surfaces are located approximately in alignment along a radius of the disc (not shown).

A leaf or noise reducing spring 32 is provided between the pads 20 and the caliper 18 so as to urge the latter radially outwards of the periphery of the disc.

Figure 2:
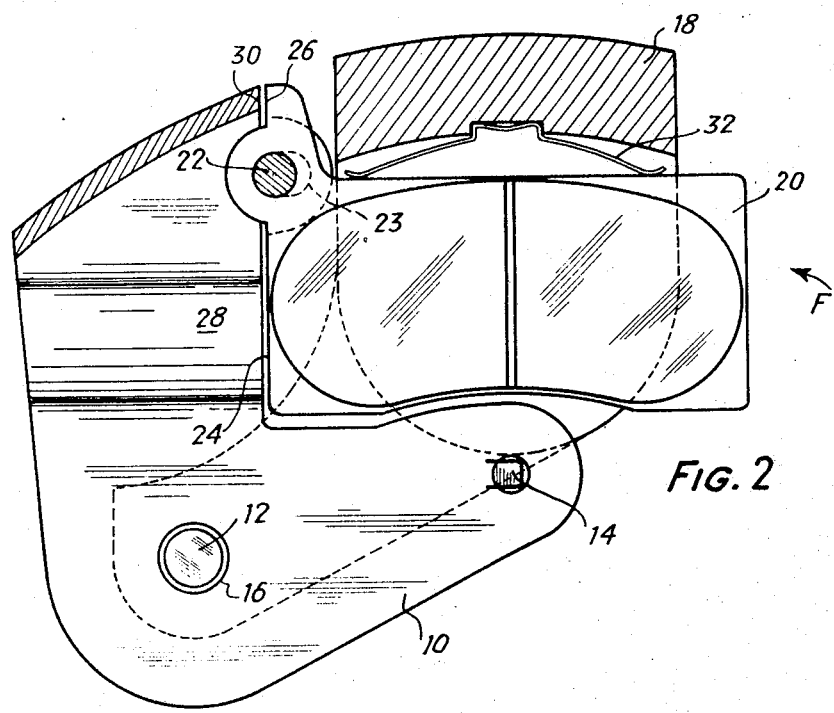
FIG. 2 is a cross-section along line 2—2 of FIG. 1.

When the disc rotates in the direction of the arrow F in FIG. 2, the actuation of the clamping means provided in the caliper 18, in applying the pads 20 against the respective faces of the disc, induces the entrainment of the pads by the disc in this direction F. Thus, the pads 20 pivots on the pin 22, which is at the outside of the periphery of the disc, until they come to anchor on the projections forming abutting surfaces 28 by way of their radial bearing edges 24. Since the edge 24 is approximately at the centre of pressure, the torque is transmitted to the fixed support by the abutting surfaces 28. The direction indicated by the arrow F is preferably that of forward rotation of the disc.

When the disc rotates in the other direction, the pads 20 come to anchor on the abutting surfaces 30 by way of their radial bearing edges 26. Since the edge 26 is at the outside of the periphery of the disc, this direction of rotation of the disc is preferentially used for the backwards rotation of the disc.

Some play may be allowed between the pin 22 and the opening provided for this pin in the pad, as indicated by broken line at 23. If so, the pad 20 comes to anchor on the fixed support at 28 and 30 by way of its bearing edges 24, 26 respectively, and the tangential braking stresses are not transmitted from the pad to the pin 22.

A brake of this kind is of course much simpler in design than known disc brakes. Moreover, all the braking torque is transmitted to the fixed support, so that there is no effect on the caliper. Other advantages of the arrangement include easy detachment of the pads, requiring only extraction of the pin 22.

It will be understood that the invention is also applicable in a disc brake wherein the caliper is fixed to the support, the clamping means being located in front of each face of the disc.

I claim:

1. In a disc brake:
a rotor having a pair of friction faces;
a U-shaped fixed support straddling said rotor and presenting a pair of legs extending generally parallel to each of said friction faces,
a pin carried by said fixed support at one edge of each of said legs, said pin extending across said rotor in a direction generally parellel to the axis of the rotor,
a pair of friction elements mounted on said pin adjacent each of said friction faces,
said one edge of each of said legs having a pair of bearing surfaces for anchoring its corresponding friction element, said pair of bearing surfaces being located in alignment on opposite sides of a plane intersecting said pin and perpendicular to a plane extending along a radius of the rotor and intersecting said pin so that each friction element anchors on one of said surfaces or the other of said surfaces, depending upon the direction of rotation of the rotor, and
a clamping member slidably mounted on said fixed support for urging said friction elements into engagement with their corresponding friction faces.

2. The invention of claim 1, wherein each leg of said support is formed with axially extending bent portions connected by portions parallel to the plane of the rotor, each of said pair of bearing surfaces comprising at least one of said axially extending bent portions.

3. The invention of claim 1, wherein said pin and said bearing surfaces are disposed in a plane extending along a radius of said rotor.

4. The invention of claim 1, and column means secured to said fixed support, said clamping member being slidably mounted on said column means.

5. The invention of claim 4, wherein said clamping member is mounted on only one column.

6. The invention of claim 5, and a noise reducing spring disposed between said friction elements and said clamping member, said spring yieldably urging said clamping member radially outwardly with respect to said rotor.

* * * * *